United States Patent [19]

Zamel et al.

[11] Patent Number: 5,790,575
[45] Date of Patent: Aug. 4, 1998

US005790575A

[54] DIODE LASER PUMPED SOLID STATE LASER GAIN MODULE

[75] Inventors: James M. Zamel, Hermosa Beach; Robert Tinti, Lakewood; George M. Harpole, San Pedro, all of Calif.

[73] Assignee: TRW Inc., Redondo Beach, Calif.

[21] Appl. No.: 683,585

[22] Filed: Jul. 15, 1996

[51] Int. Cl.$^6$ ............................................ H01S 3/04
[52] U.S. Cl. .................... 372/35; 372/92; 372/70; 372/98
[58] Field of Search .................... 372/35, 98, 92, 372/70

[56] References Cited

U.S. PATENT DOCUMENTS

| | | | |
|---|---|---|---|
| 4,378,601 | 3/1983 | Eggleston, III et al. | 372/35 |
| 4,852,109 | 7/1989 | Kuchar | 372/34 |
| 5,311,528 | 5/1994 | Fujino | 372/35 |
| 5,394,427 | 2/1995 | McMinn et al. | 372/70 |

Primary Examiner—Leon Scott, Jr.
Attorney, Agent, or Firm—Michael S. Yatsko

[57] ABSTRACT

A compact diode pumped solid state slab laser gain module 20 is described. The laser gain module comprises a ceramic housing 22, a laser gain medium 24 disposed in the laser cavity 22, and an optical pumping source. The housing is preferably composed of alumina which provides thermal and structural stability at high temperatures to maintain beam alignment and eliminates parasitic oscillations. The laser gain medium is preferably a slab of crystalline Nd:YAG. Diode laser arrays 48, 50 are provided to pump at least one side face 30, 32 of the laser gain medium. Each diode laser array 48, 50 is mounted to a manifold 40, 42 preferably formed of a plastic, non-contaminating material. The laser gain module comprises a simplified cooling distribution for cooling the laser gain medium to produce a substantially uniform temperature distribution between its top and bottom faces, and for cooling the diode laser arrays. The side faces 30, 32 are cooled by passing a coolant through flow channels 62, 64 defined between the laser gain medium and windows 50, 60 comprised of sapphire fritted to the housing.

29 Claims, 6 Drawing Sheets

DIODE LASER PUMPED SOLID STATE LASER GAIN MODULE

This invention was made with the Government's support under a contract awarded by the U.S. Air Force. The Government has certain rights in this invention.

BACKGROUND

The present invention relates to solid state lasers and, more particularly, to a diode laser pumped solid state laser gain module.

Solid state slab laser gain modules comprise a housing enclosing a solid state laser gain material such as neodymium yttrium aluminum garnet (Nd:YAG) or neodymium glass, and an optical pumping source for pumping species in the laser gain material to produce a population inversion. The laser gain medium typically has a slab configuration with a rectangular cross-section, and includes optically polished major side and end faces, and lateral faces perpendicular to the major side faces. The optical pumping source is typically flashlamps which emit over a broad spectrum of wavelengths.

Diode lasers have been used to pump solid state lasers in place of lamps. The diode lasers provide much closer matching of the absorption peak of the laser gain medium than is possible with broadband lamps. This improved wavelength matching increases the efficiency of solid state laser gain modules and reduces detrimental thermal effects.

In the typical geometry of a solid state slab laser gain module electromagnetic radiation emitted by the pumping source impinges upon the major side faces of the laser gain medium to excite the active species to create a population inversion. The interaction of the light wave with the excited atoms amplifies the light wave. A beam of coherent radiation is passed generally along the longitudinal axis of the laser medium by multiple internal zig-zag reflections from the major side faces. These internal reflections average out thermal fluctuations in the laser gain medium. The beam is amplified each time it passes through the laser medium to increase gain.

Optical pumping generates a large amount of heat within the laser gain medium and increases the medium's temperature. Siderails equipped to channel cooling water or provide heat through the system have been used to control the temperature in the environment of the lateral faces of the laser gain medium. The major side faces of the laser medium are conventionally cooled by flowing a coolant over the major side faces.

Solid state laser gain media generally have a low thermal conductivity, therefore, a thermal gradient is created between the cooled outer surfaces and the hot interior. This thermal gradient creates a thermal strain in the material, causing thermally induced optical distortions. Transverse (width-wise) optical distortions caused by transverse temperature gradients may become excessive and consequently diminish the power output of laser beam and the beam quality. Accordingly, it is important that the temperature distribution (gradient) be controlled between the top and bottom faces of the gain medium.

Another severe problem related to the generation of the solid state laser beam is maintaining beam alignment in laser gain modules which is affected by generation of intense radiation during optical pumping. The known laser gain modules comprise of metallic housings having a high thermal conductivity, but also a high coefficient of thermal expansion. These properties cause thermal and structural instability of the housings at high temperatures. The known laser gain modules are affected by thermal gradients and thermal distortion due to high thermal expansion and high absorption of radiation by the housings at high temperatures. Thermal distortion produces drift in the optical path and causes the output beam to lose alignment and go off target. This thermal distortion prevents the establishment and maintenance of a stable beam.

Another problem associated with metallic housings in high-gain laser gain modules is the generation of parasitic laser oscillations caused by the specular reflection of radiation in the laser cavity. Parasitics tend to cause lasing and ablation of the metal housing. The ablated metal can deposit on, and consequently destroy, the laser gain medium.

The known laser gain modules having metallic housings comprise elaborate cooling systems to effect proper temperature control and are typically formed of stainless steel or aluminum. This increases the size and complexity of the laser gain modules, and greatly increases their weight. The cooling systems can also be a source of contamination and hence the flow passages are often gold lined. During normal operation, the gold lining tends to come off the substrate material. The uncoated portions of the flow passages are then exposed to corrosive conditions. The gold and the corrosion products become entrained in the coolant flow stream as contaminants.

The construction and operation of solid state laser gain modules need to be improved to enhance the commercial viability of lasers for industrial applications. The known solid state laser gain modules have large, complex and heavy metallic structures. Such metallic supporting assemblies that specularly reflect radiation and are unable to provide thermal and structural stability at high temperatures to maintain beam alignment. The known laser gain modules also require complex cooling methods that further increase the size and weight of the gain modules and are a source of contamination. Furthermore, the known laser gain modules fail to provide adequate support and thermal control of the laser medium, accurate support of the diode laser arrays, and simultaneous distribution of coolant to the laser medium and to diode laser coolant flow passages, with isolation of the coolant from the diode laser arrays.

Thus, there is a need for a diode laser pumped solid state laser gain module that overcomes the above-described problems and disadvantages of the known devices.

SUMMARY

The present invention is directed to a diode laser pumped solid state slab laser gain module that satisfies the above needs. The present invention provides a compact, simplified construction; thermal and structural stability; support and thermal control of the laser gain medium to maintain beam alignment; accurate support of diode laser arrays for optically pumping the laser medium; a simplified cooling system that provides simultaneous distribution of coolant to the laser gain medium and to diode laser coolant flow passages, with isolation of coolant from the diode laser arrays; and does not specularly reflect the light wavelengths emitted by the pumping source and the laser gain medium.

The diode laser pumped solid state slab laser gain module according to the present invention comprises a ceramic housing. A laser gain medium is disposed in the housing. The laser gain medium comprises a pair of end faces and a pair of opposed side faces. At least one diode laser array is provided to radiate the laser gain medium.

The laser gain module further comprises means for cooling the laser gain medium to produce a substantially uniform temperature distribution between the bottom face and the top face, and means for cooling each of the diode laser arrays.

The housing is preferably composed of alumina which provides advantageous mechanical, thermal, contamination and optical properties. Alumina has a high thermal conductivity and a very low coefficient of thermal expansion to ensure thermal and structural stability at high temperatures. Alumina reduces the complexity of the cooling method of the laser gain module and maintains beam alignment. Alumina is also a diffuse reflector of light and has a relatively low absorption at the wavelengths of concern. These properties minimize parasitic laser oscillations and minimize heat input to the housing.

A diode laser array is preferably positioned proximate to each of the side faces to uniformly radiate the laser gain medium, which is preferably a slab of crystalline Nd:YAG. The diode laser arrays are mounted to diode laser manifolds preferably formed of a plastic material having an electrostatic discharge coating.

The means for cooling the laser gain medium comprises means for flowing a coolant over each of the side faces. A window is disposed adjacent and parallel to each side face so as to define flow channels for flowing a coolant over the side faces. The windows are preferably composed of sapphire having an anti-reflective coating thereon. The windows are preferably glass brazed to the housing. Seals are provided between the windows and the laser gain medium to seal the laser gain medium. The seals are composed of a material, preferably silicone rubber, that is transmissive to the radiation emitted by the diode laser arrays and to the laser output.

Thermal control means are provided to selectively apply heating and cooling to the top face and the bottom face. The thermal control means preferably comprises a top edge control bar disposed proximate to the top face, and a bottom edge control bar disposed proximate to the bottom face. The top and bottom edge control bars each define a coolant flow passage for flowing the coolant, and each comprise heating means to selectively apply heat to the top face and the bottom face, respectively. The top edge control bar and the bottom edge control bar are preferably bonded to the top face and the bottom face, respectively, with barium oxide loaded silicone rubber RTV.

The coolant is supplied to the various loads from a coolant distribution source having a compact, simplified construction.

BRIEF DESCRIPTION OF THE DRAWINGS

These and other features, aspects and advantages of the present invention will become better understood from the following drawings, description and appended claims, where:

DESCRIPTION

Figure 1:
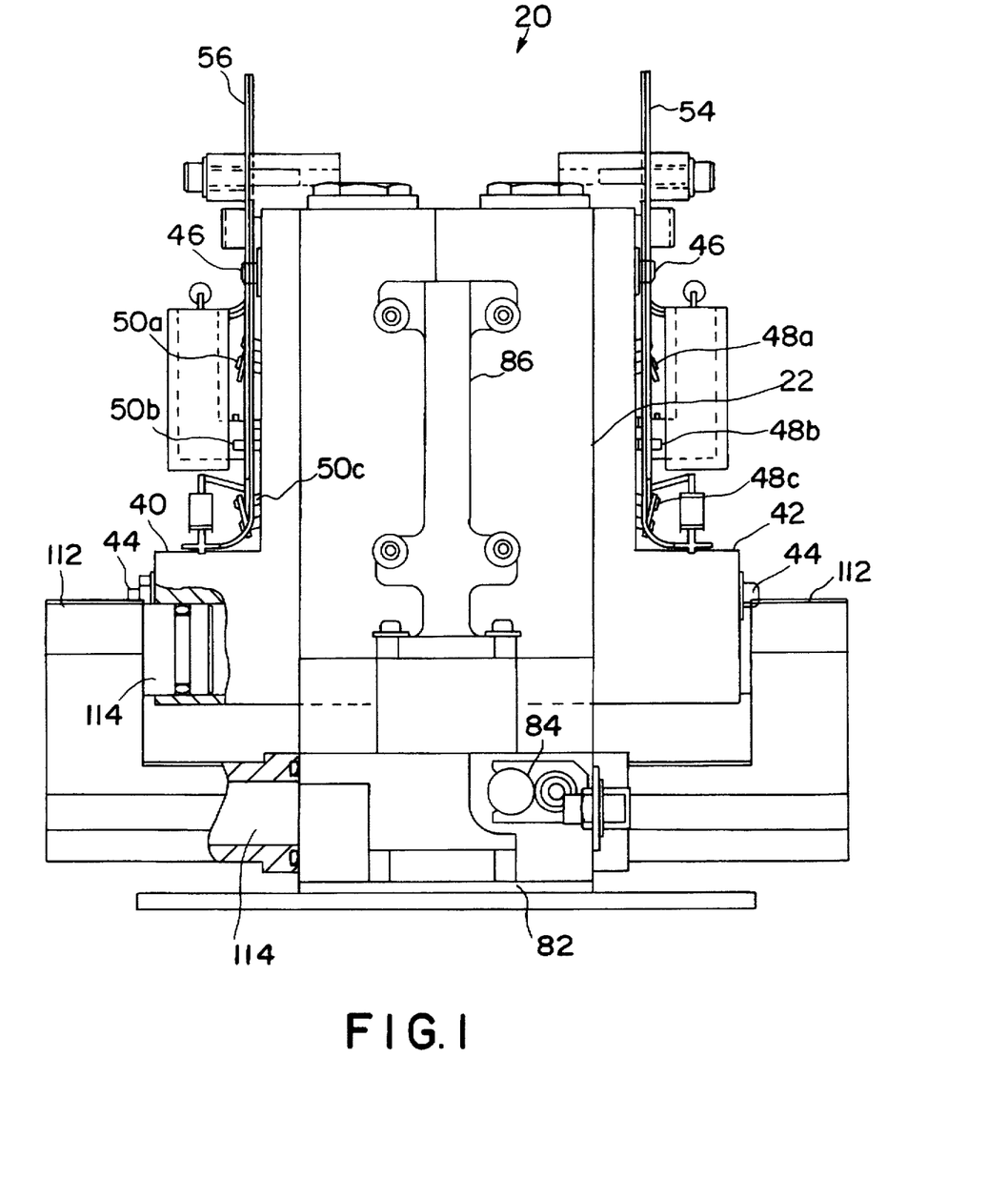
FIG. 1 is a partially broken-away side elevational view of a diode laser pumped solid state laser gain module according to the present invention.

The present invention is a diode laser pumped solid state laser gain module 20 as illustrated in FIG. 1. The laser gain module 20 comprises a housing 22 formed of a ceramic material. The housing material is preferably alumina which provides highly advantageous thermal, contamination, mechanical and optical properties. Alumina has a high thermal conductivity which minimizes thermal gradients and associated mechanical distortion caused by the absorption of radiation during pumping. In addition, alumina has a very low coefficient of thermal expansion to ensure dimensional stability at high temperatures. Alumina also minimizes heat input to the housing 22. These properties of alumina significantly reduce the cooling demands of the laser gain module 20 as compared to the known metallic housing constructions.

Alumina also has a high stiffness to enable the laser gain module 20 to maintain close tolerances under highly stressful operating conditions. Reference surfaces (not shown) are preferably provided in the housing 22 to enable the accurate positioning of the individual components of the laser gain module 20 during assembly.

Regarding optical properties, alumina is a diffuse reflector of light and has a relatively low absorption of the light at the wavelengths of interest. This minimizes the possibility of parasitic laser oscillations, which are stray light waves that can interfere with the operation of the laser gain module 20. Alumina overcomes the problem of ablation by parasitics as in the known metallic housings, and prevents the destruction of the laser gain medium by the deposition of such ablated metal.

Figure 2:
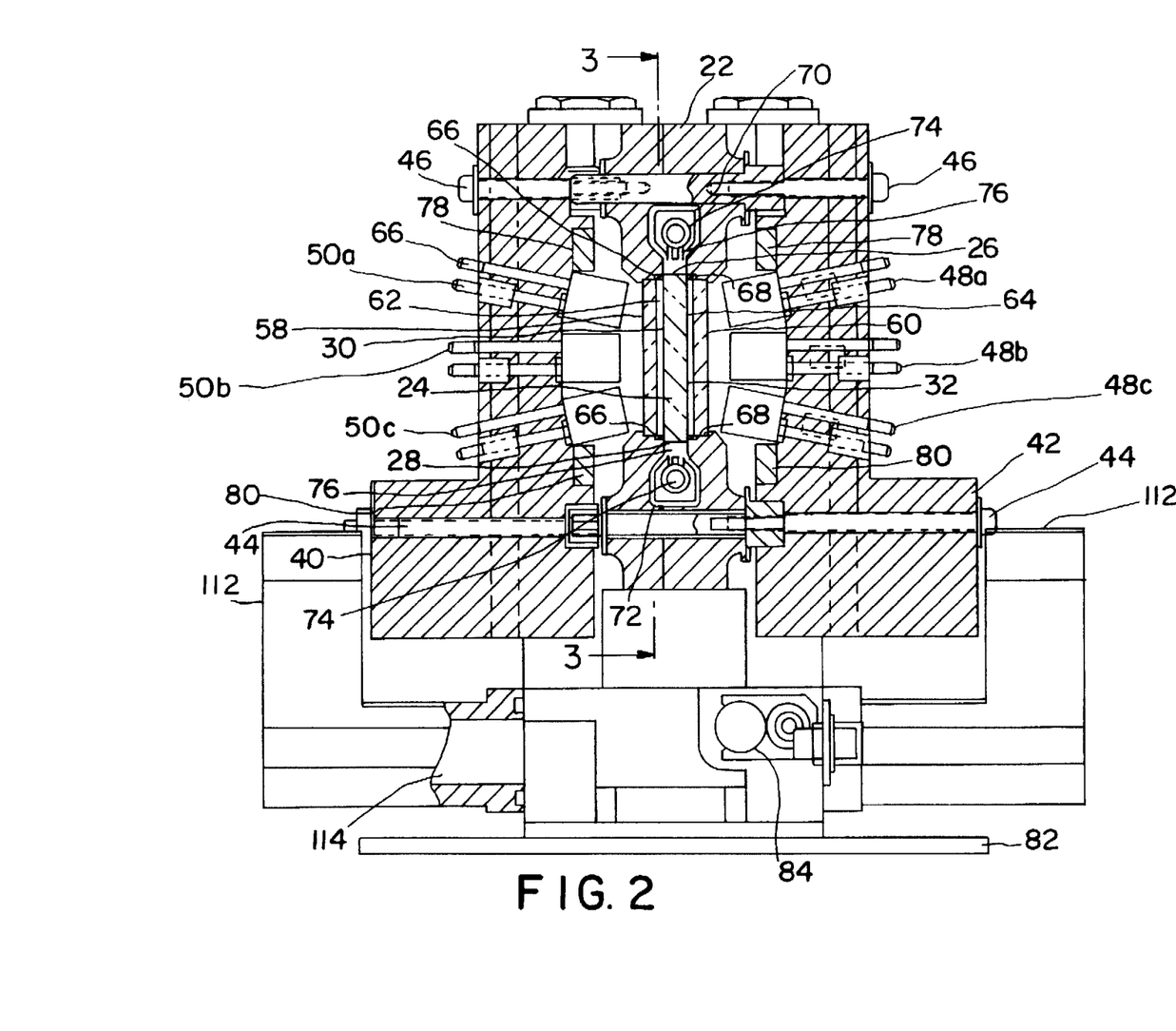
FIG. 2 is a partially broken-away transverse cross-sectional view of the laser gain module of FIG. 1.
Figure 3:
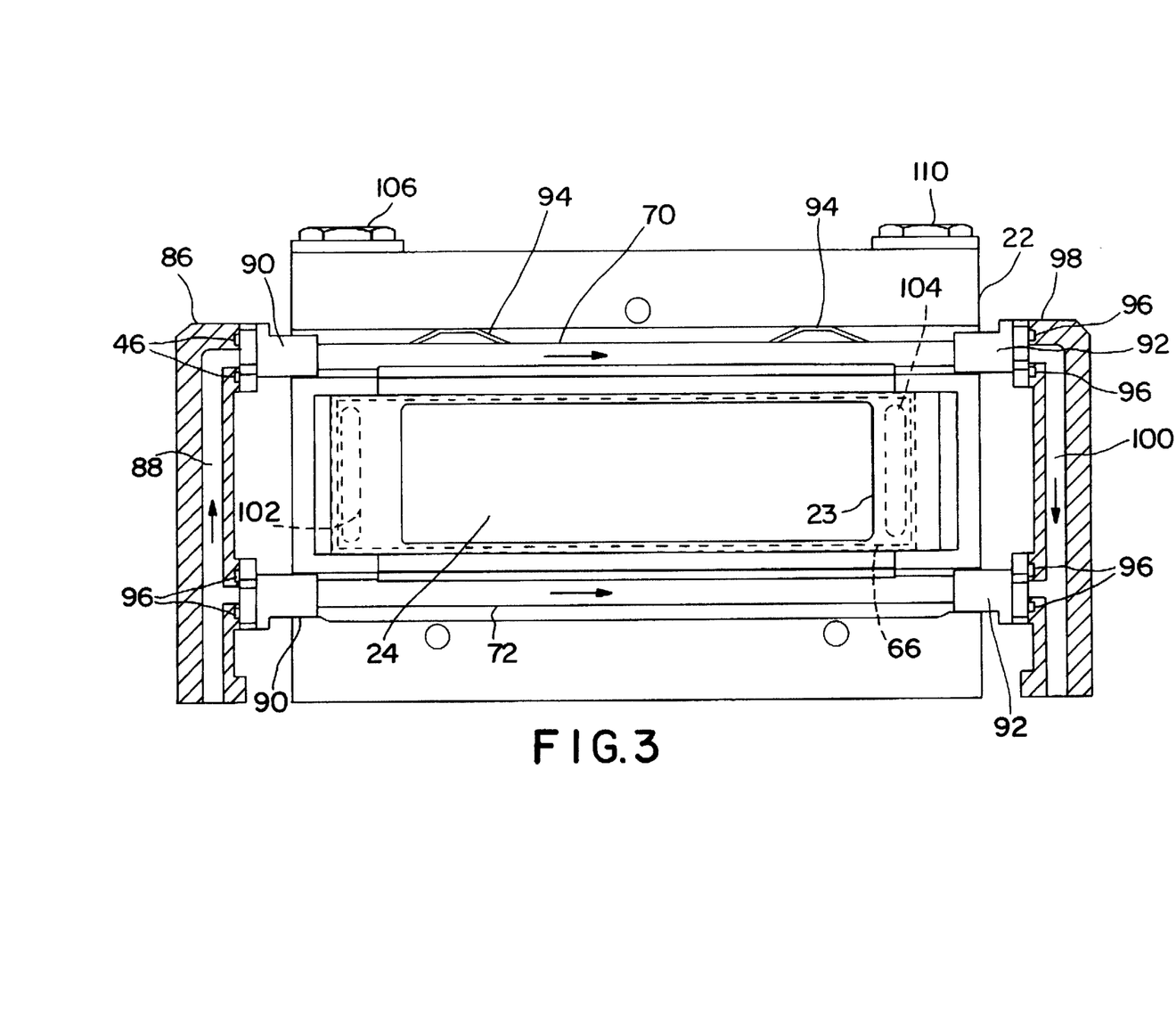
FIG. 3 is a longitudinal cross-sectional view in the direction of line 3—3 of FIG. 2; without the coolant distribution manifold.

Referring to FIGS. 2 and 3, a slab of a laser gain medium 24 is positioned within the laser cavity defined within the housing 22. As shown, the laser gain medium 24 has a rectangular cross-section and is vertically oriented in the laser gain module 20. The laser gain medium comprises a top face 26, a bottom face 28, opposed major side faces 30, 32, and opposed end faces (not shown). The side faces 30, 32 and the end faces are preferably optically polished. The end faces are preferably formed at a non-perpendicular angle to the side faces 30, 32, so that light travels longitudinally in a zig-zag pattern through the laser gain medium 24. The laser gain medium 24 absorbs radiation from an optical pumping source to create a population inversion of excited species, from which the excited species make a laser transition to produce a laser output.

The laser gain medium 24 is preferably a crystal of neodymium yttrium aluminum garnet (Nd:YAG) which emits at a major wavelength of 1064 nm. Other suitable laser gain materials such as Yb:YAG, Nd:Glass and Ti:Sapphire may optionally be used.

The radiation source for pumping the laser gain medium 24 preferably comprises a plurality of diode lasers arranged in arrays. The light output of the diode laser arrays can be accurately tuned to the absorption line of the active species in the laser gain medium 24 to achieve a high pumping efficiency, and to minimize detrimental heating effects. In the present invention, the diode laser arrays preferably emit radiation at the wavelength range of 804 nm to 808 nm to pump the laser gain medium 24. The Nd:YAG laser gain medium 24 re-emits a laser output at a wavelength of 1064 nm.

Figure 4:
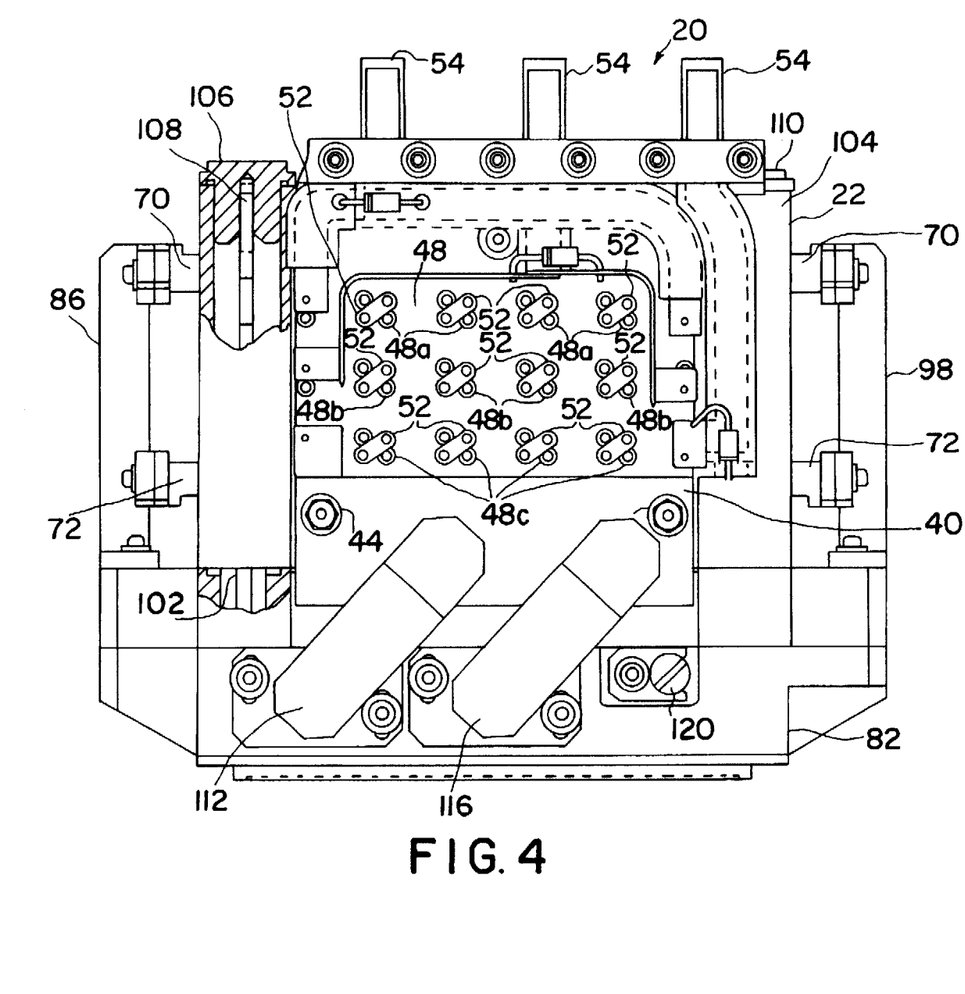
FIG. 4 is a partially broken-away front elevation of the laser gain module of FIG. 1.

As shown in FIG. 2, a pair of diode laser manifolds 40, 42 are disposed on opposite sides of the laser gain module 20. The diode laser manifolds 40, 42 are mounted to the housing 22 by fasteners such as the elongated threaded fastening elements 44, 46. Referring to FIG. 4, a plurality of individual diode lasers 48a, 48b, 48c (collectively referred to herein as the diode laser array 48) are mounted to the diode laser manifold 40. A plurality of diode lasers 50a, 50b and 50c (FIG. 2) (collectively referred to herein as the diode laser array 50) are mounted to the opposite diode laser manifold 42. The individual diode lasers of the diode laser arrays 48, 50 are preferably substantially uniformly spaced from each other as shown. As illustrated in FIG. 2, the diode lasers extend into the laser cavity, proximate to the laser gain medium 24. The diode lasers 48a, 48c, and 50a, 50c, extend into the laser cavity at an angle with the horizontal. This arrangement and orientation of the individual diode lasers provides uniform pumping of the major side faces 30, 32 of the laser gain medium 24. Other arrangements and orientations of the diode laser arrays 48, 50 may be used. Furthermore, in some instances only a single diode laser array such as the diode laser array 48 or 50 may be provided to optically pump only one major side face of the laser gain medium 24.

Referring to FIG. 4, electrical power is distributed to power connections 52 associated with the diode laser arrays 48, 50 by a plurality of diode laser power busbars 54 (FIG. 4), 56 (FIG. 1).

Although less preferred, other suitable laser pumping sources such as flashlamps may optionally be used to radiate the laser gain medium 24.

The diode laser manifolds 40, 42 are formed of a plastic material. The diode laser manifolds 40, 42 preferably comprise a three-layer construction of solvent bonded plastic having an electrostatic discharge coating. This multi-layer construction is simple and inexpensive to manufacture. Unlike the known metallic cooling systems, the plastic material is contamination free. The plastic material also is lightweight, yet it provides a high mechanical stiffness. Furthermore, the plastic material is not affected by the 804 nm to 808 nm radiation emitted by the diode laser arrays 48, 50, or the 1064 nm wavelength laser output. The coated plastic material also eliminates static build-up, when properly grounded, that is damaging to diode lasers.

Referring to FIG. 2, a pair of generally rectangular shaped windows 58, 60 are disposed on opposite sides of the laser gain medium 24, between the laser gain medium 24 and the diode laser arrays 48, 50. The windows 58, 60 are adjacent and parallel to the laser gain medium 24 so as to define coolant flow channels 62, 64, through which a coolant is flowed longitudinally over the major side faces 30, 32 of the laser gain medium 24.

The windows 58, 60 are preferably composed of sapphire. Sapphire has a coefficient of thermal expansion which closely matches that of the alumina housing 22 to enable the windows 58, 60 to be glass brazed ("fritted") to the housing 22 as indicated at 59 in FIG. 6. Other suitable materials having thermal expansion properties close to those of sapphire may optionally be used. An anti-reflective coating is applied to the windows 58, 60 to transmit the 804 nm to 808 nm wavelength radiation emitted by the diode laser arrays 48, 50, to enable optical pumping of the laser gain medium 24 through a housing opening 23 adjacent to each of the windows 58, 60 (only one housing opening 23 is shown in FIG. 3).

Fritting of the sapphire windows 58, 60 to the alumina housing 22 eliminates the need for extra fluid seals or bonded joints in the flow channels 62, 64. Such seals and joints are a potential source of fluid leaks. Fritting also eliminates complex fluid passage configurations and the use of seal mounts in the fragile sapphire windows 58, 60. Fritting further simplifies the final assembly of the laser gain module 20 as the windows 58, 60 are pre-mounted to the housing 22.

Figure 6:
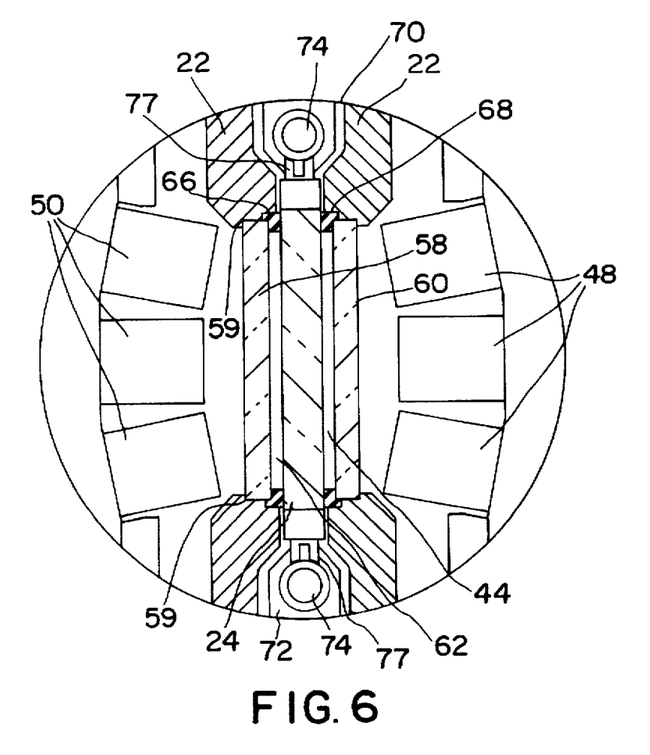
FIG. 6 is an enlarged partial view illustrating the location of the seals with respect to the sapphire windows and the laser gain medium and the fritting of the windows to the housing.

As shown in FIGS. 2 and 6, seals 66, 68 are positioned at the upper and lower faces of the windows 58, 60, respectively, to seal the laser gain medium 24 as coolant is passed through the flow channels 62, 64. The seals 66, 68 are preferably composed of a pure silicone rubber material that transmits the 804 nm to 808 nm radiation produced by the diode laser arrays 48, 50, and the 1064 nm laser output of the laser gain module 20. The seals 66, 68 may optionally be formed of other suitable light transmitting materials. By transmitting these light wavelengths, damaging heating of the seals 66, 68 is avoided. The seals 66, 68 are carefully positioned with respect to the laser gain medium 24 to minimize thermal gradients in the laser gain medium 24 that degrade optical performance.

An upper edge control bar 70 and a lower edge control bar 72 are provided to control the edge temperature and, accordingly, the temperature uniformity of the laser gain medium 24. The upper edge control bar 70 is positioned adjacent to the top face 26 of the laser gain medium 24 and the lower edge control bar 72 is positioned adjacent to the bottom face 28. The edge control bars 70, 72 each provide both heating and cooling capabilities to enable thermal control of the laser gain medium 24 by the addition and removal of heat to compliment the heating produced by the diode laser arrays 48, 50. Particularly, the edge control bars 70, 72 each include a flow channel 74 for flowing a coolant over the top face 26 and the bottom face 28 of the laser gain medium 24, and a heating element 76.

Figure 5:
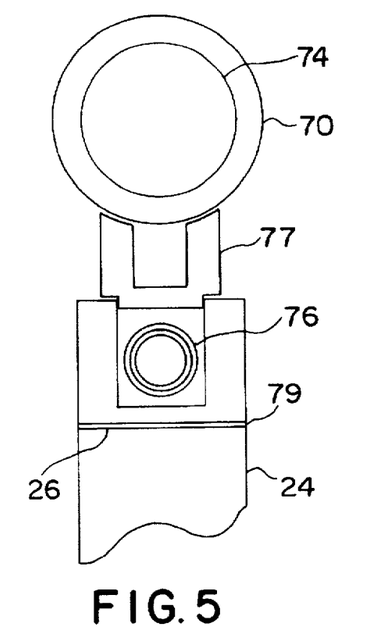
FIG. 5 is an enlarged partial view of an edge control bar mounted to the laser gain medium.

FIG. 5 illustrates the upper edge control bar 70 in greater detail. The lower edge control bar 72 has the same construction and is not illustrated for simplicity. As shown, the flow channel 74 is spaced from the heating element 76 by a thermal resistor 77 which provides a specific thermal resistance.

The edge control bar 70 is bonded to the top face 26 and bottom face 28, respectively, of the laser gain medium 24 by an adhesive 79. The preferred adhesive is barium oxide-loaded silicone rubber RTV which provides diffuse reflection and minimal absorption at the light wavelengths of 804 nm to 808 nm and 1064 nm; resistance to thermal damage; and good thermal conductivity between the edge control bars 70, 72 and the laser gain medium 24 to prevent local heating. Other adhesives may provide similar properties. In particular, other oxides of metals used as fillers provide similar optical and thermal properties.

Referring to FIG. 2, upper heat shields 78 and lower heat shields 80 are provided to contain stray light within the laser cavity of the laser gain module 20.

Figure 7:
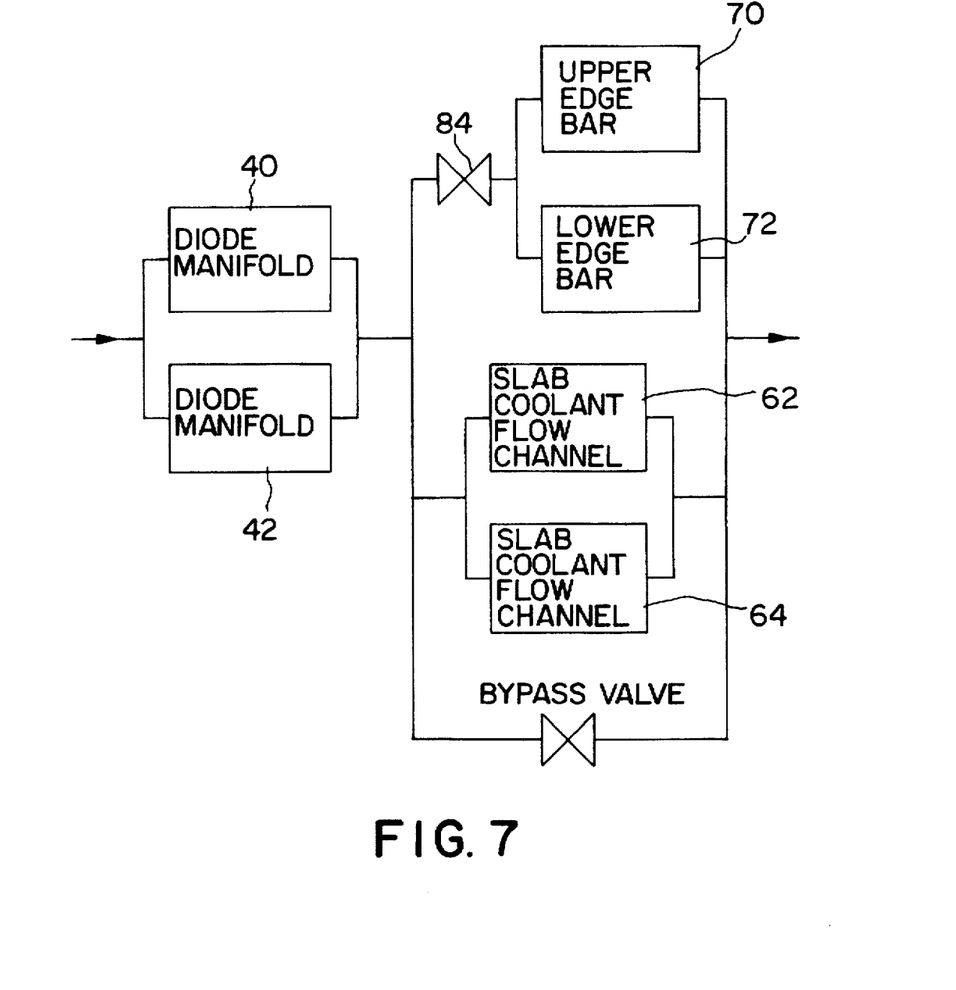
FIG. 7 is a schematic flow circuit illustrating the distribution of coolant to the diode manifolds, the edge control bars and the slab coolant flow channels.

The laser gain module 20 comprises a coolant distribution system to distribute coolant to the coolant flow channels 62, 64 between the respective windows 58, 60 and the laser gain medium 24; to the edge control bars 70, 72; and to diode laser manifold coolant passages for cooling the diode laser arrays 48, 50 as described below. The distribution of coolant to these loads is depicted in FIG. 7. The coolant is preferably water and other suitable coolant fluids may optionally be used.

Referring to FIG. 1, the coolant distribution system comprises a metallic coolant distribution base 82 and a coolant control valve 84 for adjusting the supply of coolant to the edge control bars 70, 72. Referring to FIG. 4, a flow control valve 120 is provided at the front of the laser gain module 20 to control flow into the coolant flow channels 62, 64. The coolant distributing system has a compact construction and comprises a single input and a single output port.

An edge control bar coolant supply manifold 86 is mounted to the edge control bars 70, 72 above the coolant distribution base 82. As shown in FIG. 3, the edge control bar coolant supply manifold 86 defines a coolant supply passage 88 through which coolant is flowed to the lower edge control bar 72 and to the upper edge control bar 70. The edge control bars 70, 72 are each seated at their opposite ends in a pair of flanges which also act as self-fixturing guides 90, 92. Spring clamps 94 are provided for exerting a spring force on the self-fixturing guides 90, 92 during assembly. The guides 90 are fastened to the edge control bar coolant supply manifold 86 using conventional fasteners such as screws 96. The guides 92 are fastened to an edge control bar return manifold 98 by screws 96. Coolant is passed through the edge control bars 70, 72 to cool the upper face 26 and the lower face 28 of the laser gain medium 24, and then returned to the coolant distribution base 82 through a fluid return passage 100 formed in the edge control bar return manifold 98, as represented by arrows.

Referring to FIGS. 3 and 4, the coolant is also flowed through a laser gain medium coolant supply 102 and returned through a laser gain medium coolant return 104. An end cap 106 engages an elongated fastener 108 and closes the upper end of the laser gain medium coolant supply 102. An end cap 110 closes the upper end of the laser gain medium coolant return 104. The coolant is flowed longitudinally through the coolant flow channels 62, 64 between the respective windows 58, 60 and the laser gain medium 24 to cool the major side faces 30, 32 of the laser gain medium 24, and the coolant is then returned to the coolant supply source through the laser gain medium return 104.

Coolant is also distributed to cool the laser diode arrays 48, 50. As shown in FIG. 4, the coolant distribution system comprises a diode laser manifold coolant supply feed 112 which defines a supply feed passage 114 (see FIG. 1) through which the coolant is flowed to the diode laser manifolds 40, 42, and a diode laser manifold coolant return feed 116 defining a return feed passage (not shown) through which the coolant is returned to the coolant distribution base 82. The manifold coolant supply feed 112 and the manifold coolant return feed 116 are typically formed of metal. The coolant is distributed within the diode laser manifolds 40, 42 to cool each of the laser diodes of the diode laser arrays 48, 50.

Therefore, the laser gain module 20 according to the present invention has a compact, simple construction which provides a high level of support and thermal control of the laser gain medium 24 to maintain beam alignment in the laser cavity. These advantages are achieved by using an alumina housing 22 construction. Alumina overcomes the problem of metal ablation and associated laser gain medium failure, and allows the use of glass brazing to the sapphire windows 58, 60. The housing 22 also provides accurate support of the diode laser arrays 48, 50 to ensure consistent optical pumping of the laser gain medium 24. In addition, the alumina housing 22 reduces cooling demands and allows the use of a simplified coolant distribution system to distribute coolant to the laser gain medium 24 and to the diode laser manifolds 40, 42, with the isolation of coolant from the diode pump arrays 48, 50. The coolant distribution system also eliminates the problem of contamination due to metallic spalling and corrosion. The laser gain module 20 maintains a substantially uniform temperature distribution in the laser gain medium along the vertical direction to increase beam quality. Furthermore, the materials used to construct the laser gain module 20 are not adversely affected by, and do not specularly reflect, the light wavelengths of 804 nm to 808 nm, and 1064 nm.

The present invention has been described in considerable detail with reference to certain preferred embodiments thereof, however, other embodiments are possible. Therefore, the spirit and scope of the appended claims should not be limited to the description of the preferred embodiments contained herein.

What is claimed is:

1. A diode laser pumped solid state slab laser gain module for producing an output beam, comprising:

a ceramic housing;

a laser gain medium disposed in and supported by the ceramic housing, the laser gain medium comprising a top face, a bottom face and a pair of opposed side faces;

pumping means mounted to the ceramic housing and positioned proximate to at least one of the side faces to radiate the laser gain medium and produce an output beam; means for cooling the laser gain medium to produce a substantially uniform temperature distribution between the bottom face and the top face; and means for cooling each of the pumping means;

wherein the ceramic housing has an effective thermal conductivity and coefficient of thermal expansion to substantially maintain alignment of the output beam in the laser cavity.

2. The laser gain module of claim 1, wherein the housing is composed of alumina.

3. The laser gain module of claim 1, wherein the pumping means comprises a diode laser array positioned proximate to each of the side faces to radiate the laser gain medium.

4. The laser gain module of claim 1, wherein the means for cooling the laser gain medium comprises means for flowing a coolant over each of the side faces.

5. The laser gain module of claim 4, wherein the means for flowing a coolant over each of the side faces comprises a pair of windows, each of the windows is adjacent and parallel to one of the side faces so as to define a coolant fluid passage through which the coolant is longitudinally flowed, and sealing means for sealing the laser gain medium.

6. The laser gain module of claim 5, wherein the windows have a coefficient of thermal expansion closely matching the coefficient of thermal expansion of the ceramic housing, and the windows have an anti-reflective coating thereon effective to transmit the radiation emitted by each of the pumping means.

7. The laser gain module of claim 6, wherein the windows are composed of sapphire and the windows are glass brazed to the ceramic housing.

8. The laser gain module of claim 5, wherein the sealing means comprises material transmissive to the radiation emitted by each of the pumping means and to the laser output, each of the seals is disposed substantially between one of the windows and the laser gain medium.

9. The laser gain module of claim 5, wherein the sealing means comprises a pair of seals composed of optically clear (at wavelength of interest) silicone rubber, each of the seals is disposed substantially between one of the windows and the laser gain medium.

10. The laser gain module of claim 1, wherein the laser gain medium is comprised of crystalline Nd:YAG.

11. The laser gain module of claim 10, wherein each of the pumping means emits radiation having a wavelength of from 804 nm to 808 nm.

12. The laser gain module of claim 1, further comprising thermal control means disposed proximate to the top face and to the bottom face to selectively heat or cool the top face and the bottom face.

13. The laser gain module of claim 12, wherein the thermal control means comprise a top edge control bar disposed proximate to the top face and a bottom edge control bar disposed proximate to the bottom face, the top edge control bar and the bottom edge control bar each define a coolant flow passage through which coolant is flowed, and the top edge control bar and the bottom edge control bar each comprise heating means to selectively apply heat to the top face and the bottom face, respectively.

14. The laser gain module of claim 13, wherein the top edge control bar and the bottom edge control bar are bonded to the top face and the bottom face, respectively, with barium oxide-loaded (or other metal oxide loaded) silicone rubber RTV or other thermally conductive adhesive.

15. The laser gain module of claim 1, wherein each of the pumping means is mounted to a manifold, and each of the manifolds is mounted to the housing.

16. The laser gain module of claim 15, wherein each of the manifolds is formed of a plastic material having an electrostatic discharge coating thereon.

17. The laser gain module of claim 15, wherein each of the manifolds comprises a plurality of layers of a plastic material having a solvent bonded (or other adhesive method) construction, and each of the manifolds has an electrostatic discharge coating thereon.

18. A diode laser pumped solid state slab laser gain module for producing a laser output, comprising:
 a ceramic housing;
 a laser gain medium disposed in and supported by the ceramic housing, the laser gain medium comprising a top face, a bottom face and a pair of opposed side faces;
 means for flowing a coolant over each of the side faces;
 thermal control means disposed proximate to the top face and the bottom face to selectively heat and cool the top face and the bottom face;
 a diode laser array positioned proximate to each of the side faces to radiate the laser gain medium, each of the diode laser arrays being mounted to a diode laser manifold mounted to the housing, and each of the diode laser manifolds being formed of a plastic material having an electrostatic coating thereon; and
 means for supplying coolant to each of the diode laser manifolds to cool the diode laser arrays;
 wherein the ceramic housing has an effective thermal conductivity and coefficient of thermal expansion to substantially maintain alignment of the output beam in the laser cavity.

19. The laser gain module of claim 18, wherein the housing is composed of alumina.

20. The laser gain module of claim 18, wherein the means for flowing a coolant over each of the side faces comprises a pair of windows, each of the windows is adjacent and parallel to one of the side faces so as to define a coolant fluid passage through which the coolant is flowed, and sealing means for sealing the laser gain medium.

21. The laser gain module of claim 20, wherein the windows are comprised of sapphire having an anti-reflective coating thereon effective to transmit the radiation emitted by each of the diode laser arrays.

22. The laser gain module of claim 21, wherein the windows are glass brazed to the housing.

23. The laser gain module of claim 20, wherein the sealing means comprises a pair of seals composed of optically clear (at wavelength of interest) silicone rubber, each of the seals is disposed substantially between one of the windows and the laser gain medium.

24. The laser gain module of claim 18, wherein the laser gain medium is comprised of crystalline Nd:YAG.

25. The laser gain module of claim 18, wherein the thermal control means comprise a top edge control bar disposed proximate to the top face and a bottom edge control bar disposed proximate to the bottom face, the top edge control bar and the bottom edge control bar each define a coolant flow passage through which the coolant is flowed, the top edge control bar and the bottom edge control bar each comprise heating means to selectively apply heat to the top face and the bottom face, respectively, and the top edge control bar and the bottom edge control bar are bonded to the top face and the bottom face, respectively, with barium oxide loaded silicone rubber RTV or other thermally conductive adhesive.

26. The laser gain module of claim 18, wherein each of the diode laser manifolds comprises a plurality of layers of a plastic material having a solvent bonded construction, and each of the diode laser manifolds has an electrostatic discharge coating thereon.

27. A diode laser pumped solid state slab laser gain module for producing a laser output, comprising:
 an alumina housing;
 a laser gain medium composed of crystalline Nd:YAG disposed in and supported by the housing, the laser gain medium comprising a top face, a bottom face and a pair of opposed side faces;
 a diode laser array positioned proximate to each of the side faces to radiate the laser gain medium, each of the diode arrays being mounted to a diode laser manifold mounted to the housing, each of the diode laser manifolds being formed of a plastic material having an electrostatic coating thereon;
 a pair of windows glass-brazed to the housing, each of the windows being adjacent and parallel to one of the side faces so as to define a coolant fluid passage through which the coolant is flowed longitudinally over the side faces, each of the windows being comprised of sapphire having an anti-reflective coating thereon effective to transmit the radiation emitted by the diode laser arrays;
 a pair of seals composed of clear silicone rubber, each of the seals being disposed substantially between one of the windows and the laser gain medium to seal the laser gain medium;
 thermal control means disposed proximate to the top face and the bottom face to selectively apply cooling and heating to the top face and the bottom face; and
 means for supplying coolant to each of the diode laser manifolds to cool the diode laser arrays.

28. The laser gain module of claim 27, wherein the thermal control means comprise a top edge control bar disposed proximate to the top face and a bottom edge control bar disposed proximate to the bottom face, the top edge control bar and the bottom edge control bar each define a coolant flow passage through which the coolant is flowed, the top edge control bar and the bottom edge control bar each comprise heating means to selectively apply heat to the top face and the bottom face, respectively, and the top edge control bar and the bottom edge control bar are bonded to the top face and the bottom face, respectively, with barium oxide loaded silicone rubber RTV or other thermally conductive adhesive.

29. The laser gain module of claim 28, wherein each of the diode laser manifolds comprises a plurality of layers of a plastic material having a solvent bonded construction, and each of the diode laser manifolds has an electrostatic discharge coating thereon.

* * * * *